US012313491B2

(12) United States Patent
Tei et al.

(10) Patent No.: US 12,313,491 B2
(45) Date of Patent: May 27, 2025

(54) OPTICAL FIBER BENDING LOSS MEASURING METHOD

(71) Applicant: SUMITOMO ELECTRIC INDUSTRIES, LTD., Osaka (JP)

(72) Inventors: Chonde Tei, Utsunomiya (JP); Tomoaki Hatanaka, Utsunomiya (JP); Yuki Kawaguchi, Osaka (JP); Tomoko Terauchi, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 203 days.

(21) Appl. No.: 18/009,509

(22) PCT Filed: Jun. 10, 2021

(86) PCT No.: PCT/JP2021/022200
§ 371 (c)(1),
(2) Date: Dec. 9, 2022

(87) PCT Pub. No.: WO2021/251474
PCT Pub. Date: Dec. 16, 2021

(65) Prior Publication Data
US 2023/0314278 A1 Oct. 5, 2023

(30) Foreign Application Priority Data
Jun. 12, 2020 (JP) .................................. 2020-102574

(51) Int. Cl.
G01M 11/00 (2006.01)

(52) U.S. Cl.
CPC .................................. *G01M 11/33* (2013.01)

(58) Field of Classification Search
CPC ........................ G01M 11/0214; G01M 11/33
See application file for complete search history.

(56) References Cited

U.S. PATENT DOCUMENTS

| 4,636,070 A | 1/1987 | Ide |
| 4,714,343 A | 12/1987 | Ide |
| 2003/0142948 A1 | 7/2003 | Lucas |
| 2008/0272221 A1 | 11/2008 | Emerson et al. |

FOREIGN PATENT DOCUMENTS

| JP | S61-128134 A | 6/1986 |
| JP | S61-239137 A | 10/1986 |
| JP | H01-203938 A | 8/1989 |
| JP | 2012-018134 A | 1/2012 |

*Primary Examiner* — Hina F Ayub
(74) *Attorney, Agent, or Firm* — Faegre Drinker Biddle & Reath LLP

(57) ABSTRACT

An optical fiber bending loss measuring method for obtaining a bending loss of an optical fiber by applying bending to the optical fiber with mandrels provided between a feeding portion and a fixing portion and arranged alternately in a longitudinal direction of the optical fiber. The method includes fixing the optical fiber to the fixing portion by passing the optical fiber fed out from the feeding portion between the mandrels, moving the movable mandrel to a forward position and applying bending to the optical fiber by holding the optical fiber between the adjacent mandrels, and obtaining the bending loss of the optical fiber while the bending is applied to the optical fiber.

5 Claims, 12 Drawing Sheets

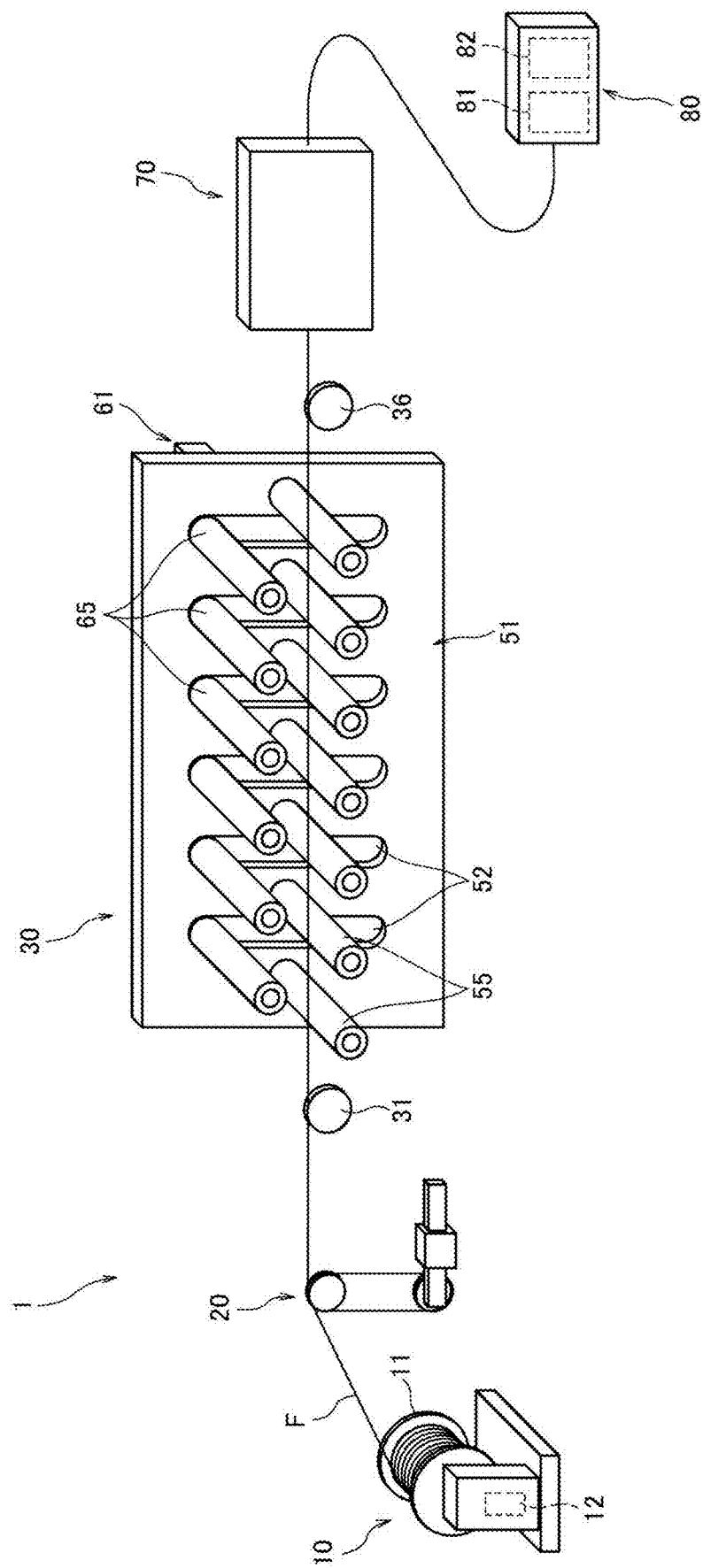

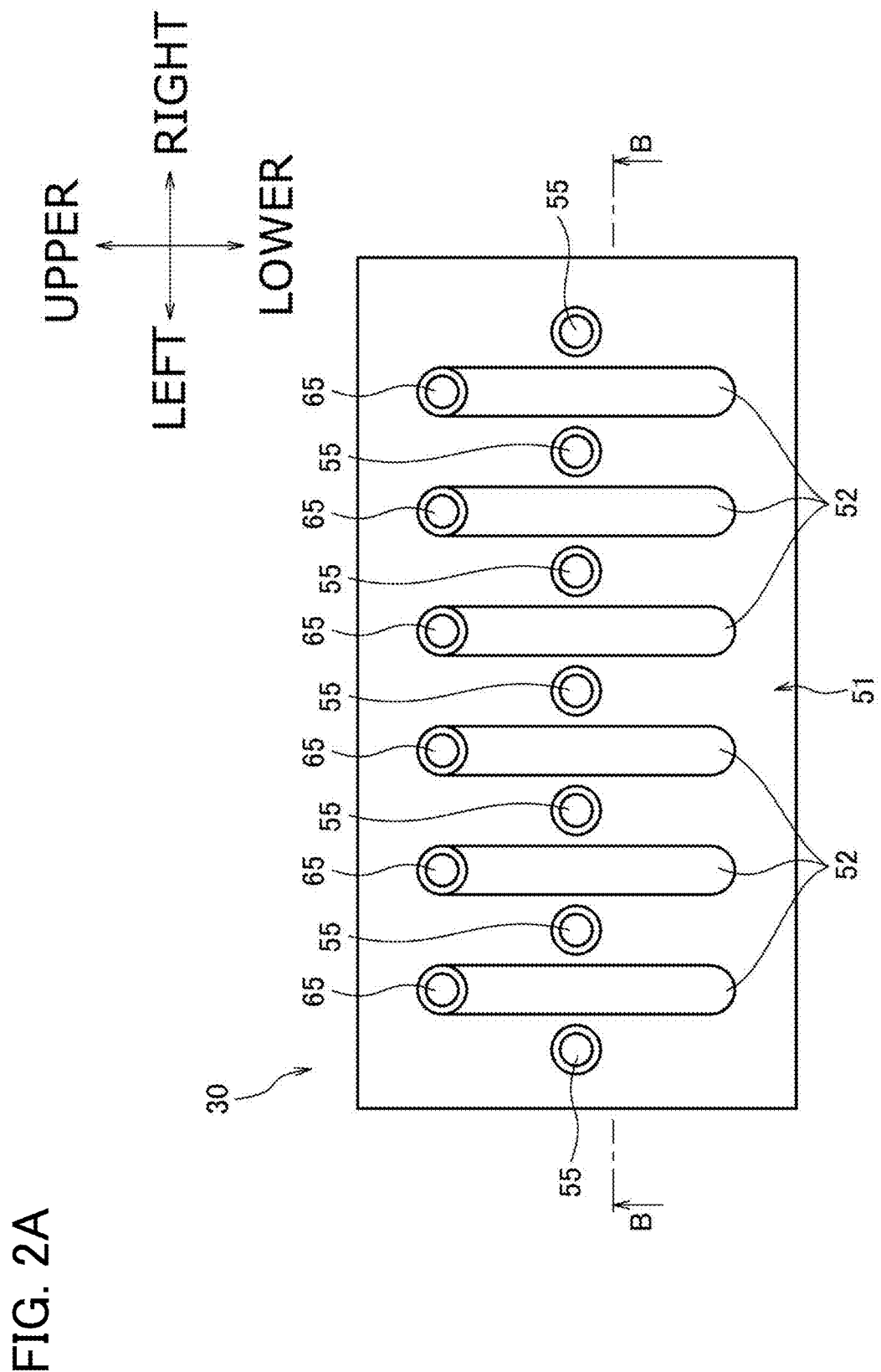

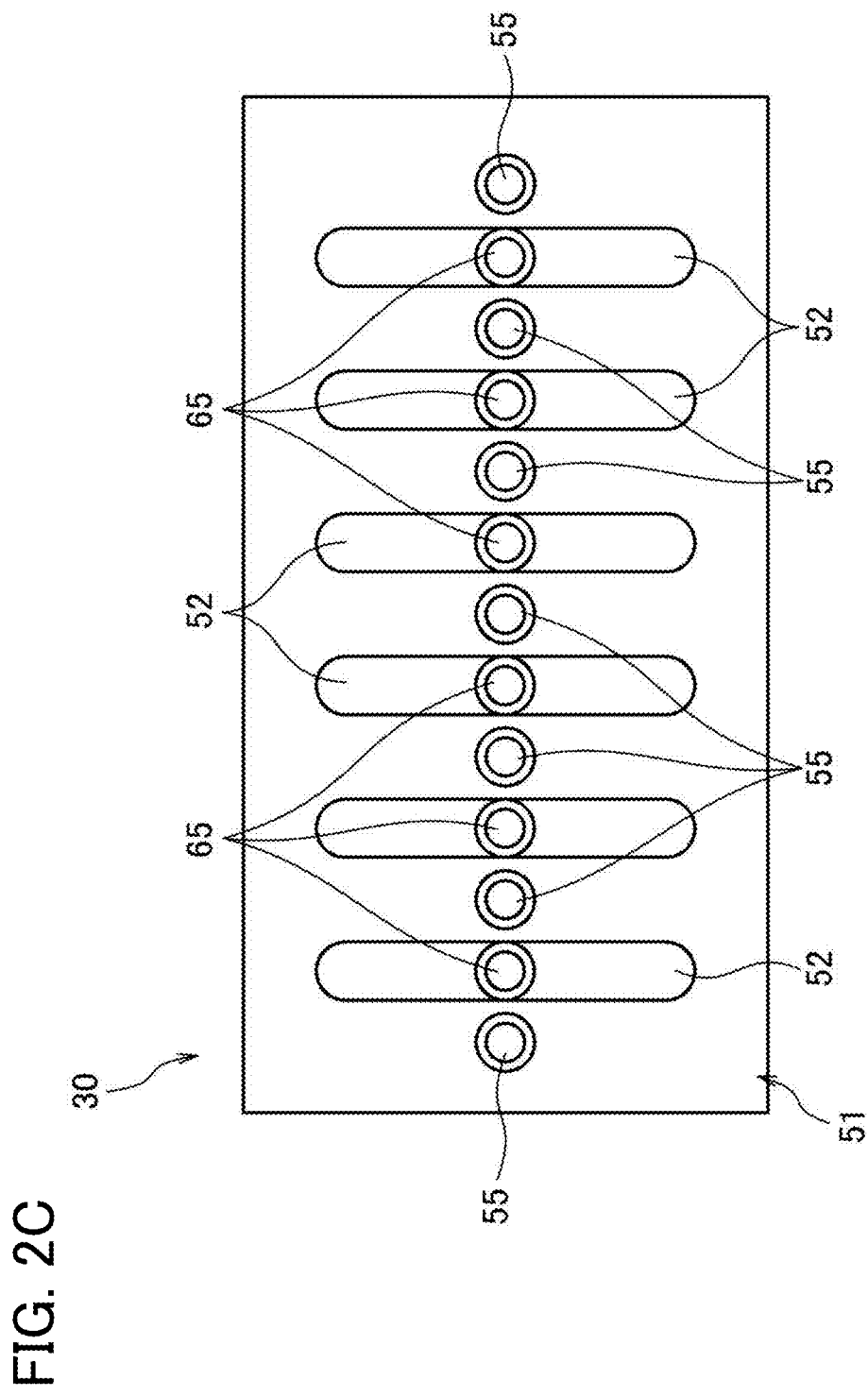

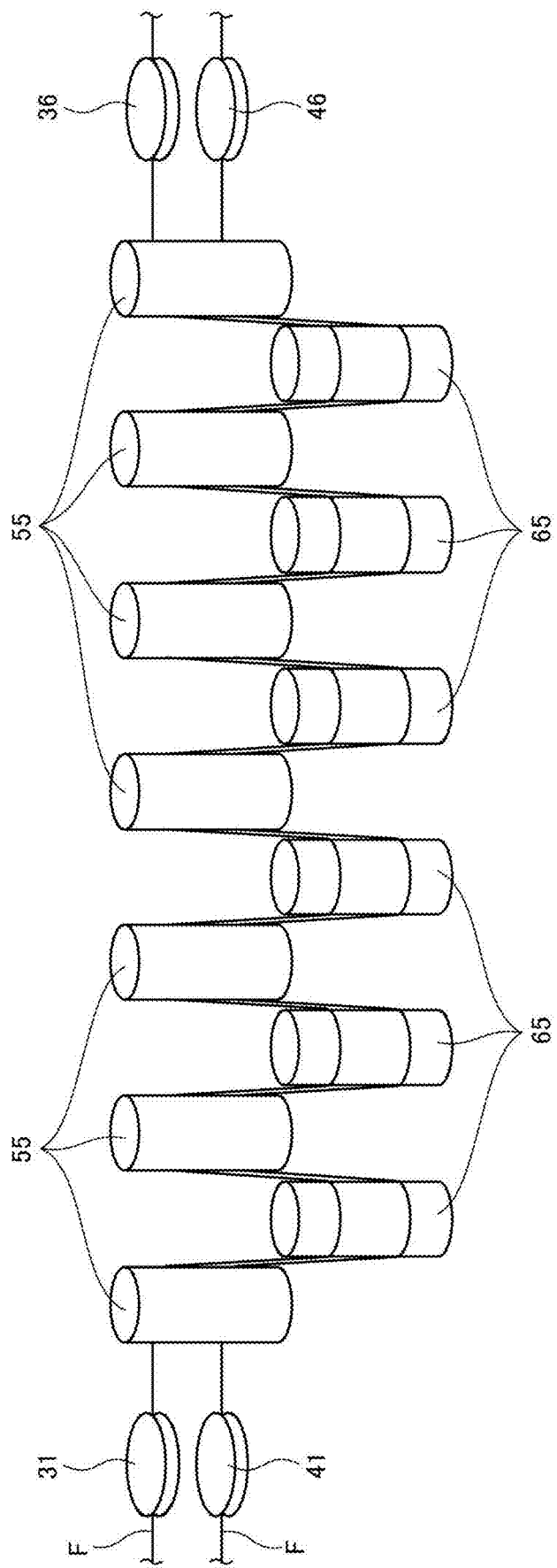

OPTICAL FIBER BENDING LOSS MEASURING METHOD

TECHNICAL FIELD

The present disclosure relates to an optical fiber bending loss measuring method.

The present application claims priority from Japanese Patent Application No. 2020-102574 filed on Jun. 12, 2020, contents of which are incorporated by reference in its entirety.

BACKGROUND ART

Bending loss characteristic is one of the basic characteristics of an optical fiber. Recommendation G.652 of International Telecommunication Union-Telecommunication Standardization sector (ITU-T) describes characteristics of a general-purpose single mode fiber (SMF), and recommendation G.657 describes characteristics of a low bending loss single mode optical fiber.

A bending loss is calculated by attenuation of light caused by a bent optical fiber. For example, Patent Literature 1 discloses a technique for calculating a bending loss caused by an entire length of an optical fiber.

CITATION LIST

Patent Literature

Patent Literature 1: JP2012-018134A

SUMMARY OF INVENTION

An optical fiber bending loss measuring method according to an aspect of the present disclosure is an optical fiber bending loss measuring method for obtaining a bending loss of an optical fiber by applying bending to the optical fiber through use of a plurality of mandrels provided between a feeding portion of the optical fiber and a fixing portion of the optical fiber and arranged alternately in a longitudinal direction of the optical fiber, in which the adjacent mandrels are a fixed mandrel that does not move, and a movable mandrel that is movable between a reference position at which bending is not applied to the optical fiber and a forward position at which the bending is applied to the optical fiber with the fixed mandrels. The optical fiber bending loss measuring method includes: a step of passing the optical fiber fed out from the feeding portion between the mandrels in a state in which the optical fiber is not disposed between the adjacent mandrels and fixing the optical fiber to the fixing portion; a step of moving the movable mandrel to the forward position and applying bending to the optical fiber by holding the optical fiber between the adjacent mandrels so as to bend the optical fiber at a predetermined angle in the longitudinal direction; and a step of obtaining the bending loss of the optical fiber in a state in which the bending is applied to the optical fiber.

BRIEF DESCRIPTION OF DRAWINGS

FIG. 1 is a schematic configuration diagram of a bending test apparatus that performs an optical fiber bending loss measuring method according to an embodiment of the present disclosure.

FIG. 2A is a front view of a bending applying device of FIG. 1.

FIG. 2C is a diagram illustrating an operation of the bending applying device of FIG. 1.

FIG. 9 is a diagram illustrating an example in which a plurality of guides are arranged in parallel.

TECHNICAL PROBLEM

Figure 2B:
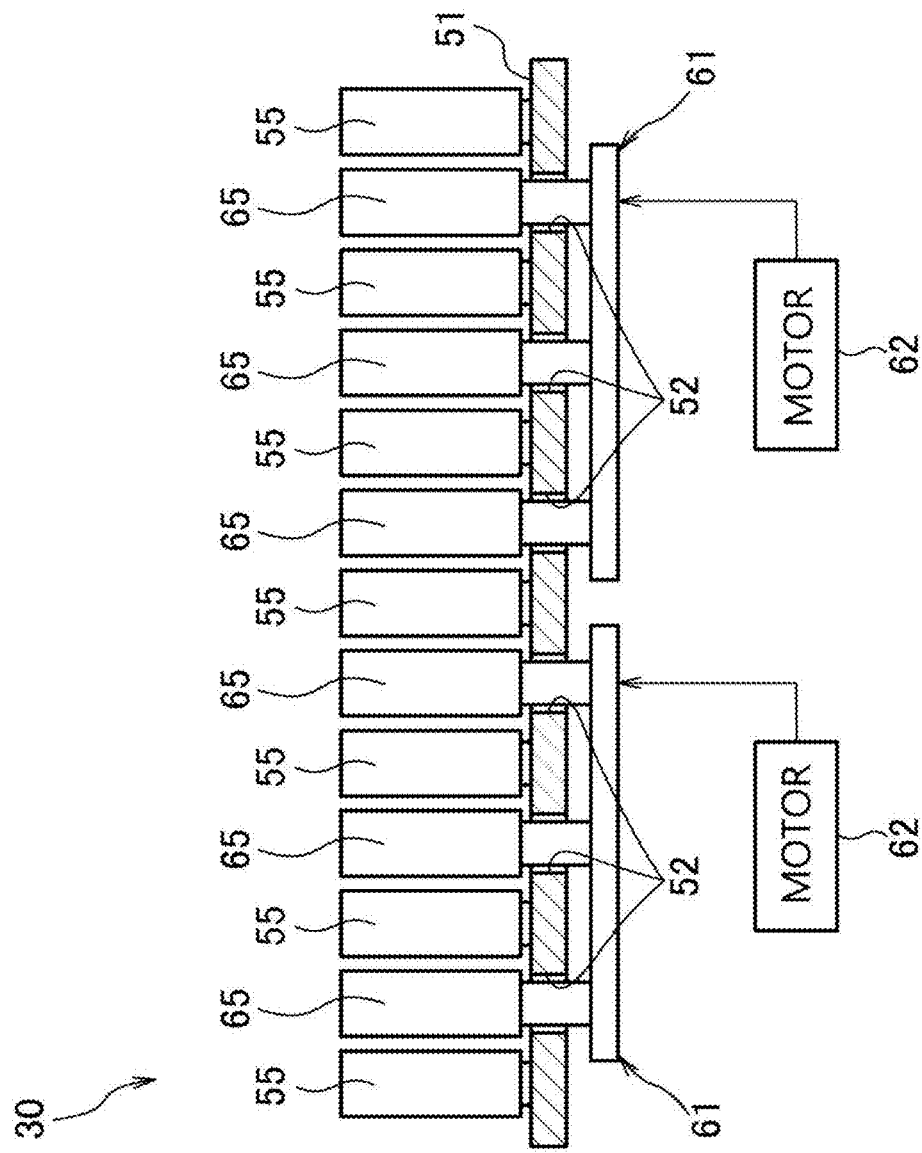
FIG. 2B is a cross-sectional view taken along a line B-B of FIG. 2A.

In the technique described in Patent Literature 1, the bending loss is calculated by applying bending to the optical fiber in a state in which the optical fiber is fed out. In this case, since the position of the optical fiber with respect to a mandrel changes at any time, measurement variation may increase. Therefore, a bending loss measuring method in which a measurement variation does not increase is desired.

Further, in the technique described in Patent Literature 1, an operator needs to hook the optical fiber to the mandrel, which makes an operation troublesome. Therefore, a bending loss measuring method that does not make the operation troublesome is also desired.

The present disclosure has been made in view of the above circumstances, and an object thereof is to provide an optical fiber bending loss measuring method in which a measurement variation does not increase and an operation is not troublesome.

Effects of Present Disclosure

According to the above, the measurement variation does not increase. Further, the operation is not troublesome.

DESCRIPTION OF EMBODIMENTS OF PRESENT DISCLOSURE

First, contents of embodiments of the present disclosure will be listed and described.

(1) An optical fiber bending loss measuring method according to the present disclosure is an optical fiber bending loss measuring method for obtaining a bending loss of an optical fiber by applying bending to the optical fiber by using a plurality of mandrels provided between a feeding portion of the optical fiber and a fixing portion of the optical fiber and arranged alternately in a longitudinal direction of the optical fiber, the adjacent mandrels being a fixed mandrel that is configured not to move, and a movable mandrel that is movable between a reference position at which bending is not applied to the optical fiber and a forward position at which the bending is applied to the optical fiber with the fixed mandrels. The optical fiber bending loss measuring method includes: a step of passing the optical fiber fed out from the feeding portion between the mandrels in a state in which the optical fiber is not disposed between the adjacent mandrels and fixing the optical fiber to the fixing portion; a step of moving the movable mandrel to the forward position and applying bending to the optical fiber by holding the optical fiber between the adjacent mandrels so as to bend the optical fiber at a predetermined angle in the longitudinal direction; and a step of obtaining the bending loss of the optical fiber in a state in which the bending is applied to the optical fiber.

Since the bending loss is calculated by applying bending to the optical fiber through use of the mandrels in a state in which the optical fiber is fixed to the fixing portion, the measurement variation does not increase. Further, since the movable mandrel is moved to the forward position and the bending loss is applied to the optical fiber by holding the optical fiber between the movable mandrel and the fixed mandrel, it is not necessary for the operator to hook the optical fiber on the mandrels, and the operation is not troublesome.

(2) In an aspect of the optical fiber bending loss measuring method according to the present disclosure, among a plurality of the movable mandrels, a movable mandrel located in the vicinity of the fixing portion is moved before a movable mandrel located in the vicinity of the feeding portion to apply bending to the optical fiber.

Since the optical fiber is bent from a fixing portion side to a feeding portion side, tension generated in the optical fiber may be leveled to eliminate a portion to which excessive tension is applied.

(3) In an aspect of the optical fiber bending loss measuring method according to the present disclosure, the movable mandrel located in the vicinity of the fixing portion is formed to have a larger diameter than the movable mandrel located in the vicinity of the feeding portion.

Since the mandrels are configured to have two types of diameters and moved in order from the mandrel having a large diameter to apply bending, the bending loss with respect to a plurality of bending diameters may be measured, and the number of times of measurement of a reference is reduced. Accordingly, time required for measuring the bending loss of the optical fiber may be shortened.

(4) In an aspect of the optical fiber bending loss measuring method according to the present disclosure, the feeding portion is disposed in parallel along a direction intersecting the longitudinal direction of the optical fiber.

Since bending may be applied to a plurality of optical fibers at the same time through use of the mandrels, efficiency of measuring the bending loss of the optical fibers may be improved.

DESCRIPTION OF EMBODIMENTS

Details of Embodiments of Present Disclosure

Hereinafter, specific examples of an optical fiber bending loss measuring method according to the present disclosure will be described with reference to the accompanying drawings. FIG. 1 is a schematic configuration diagram of a bending test apparatus 1 that performs the optical fiber bending loss measuring method according to an aspect of the present disclosure.

As illustrated in FIG. 1, the bending test apparatus 1 includes a feeding portion 10, a dancer roller 20, a bending applying device 30, a fiber catcher 70, and a power meter 80. The fiber catcher 70 corresponds to a fixing portion of the present disclosure.

An optical fiber F is manufactured in advance, and is attached to the feeding portion in a state of being wound around a bobbin 11. A light source 12 for inputting light to one end of the optical fiber F is installed in the feeding portion 10.

The optical fiber F fed out from the bobbin 11 of the feeding portion 10 is sent to the bending applying device 30 in a state in which tension is applied by the dancer roller 20, and is fixed to the fiber catcher 70.

In the bending applying device 30, it is possible to apply bending to the optical fiber F through use of fixed mandrels 55 and movable mandrels 65, which will be described later.

The optical fiber F fixed to the fiber catcher 70 is connected to the power meter 80. The power meter 80 includes, for example, a light receiving unit 81 and a calculation unit 82. The light receiving unit 81 measures power of light output from the other end of the optical fiber F. The calculation unit 82 calculates a bending loss of the optical fiber F based on the power of the light measured by the light receiving unit 81 and a length of the optical fiber F to which the bending is applied by the bending applying device 30.

In this way, since the bending loss is calculated by applying bending to the optical fiber F with the bending applying device 30 in a state in which the optical fiber F is fixed to the fiber catcher 70, compared to a case in which the bending loss is calculated by applying bending over the entire length of the optical fiber, the measurement variation does not increase.

In addition to the fixed mandrels 55 and the movable mandrels 65, the bending applying device 30 includes a guide 31 between the bending applying device 30 and the dancer roller 20 and a guide 36 between the bending applying device 30 and the fiber catcher 70. The guide 31 secures a supply height of the optical fiber F directed toward the bending applying device 30, and the guide 36 secures a discharge height of the optical fiber F away from the bending applying device 30.

As illustrated in FIG. 2A, the bending applying device 30 includes, for example, a base plate 51 having a rectangular shape in a front view. The base plate 51 is provided with a plurality of (for example, five) through grooves 52 at equal intervals. Each of the through grooves 52 extends along a direction (an upper-lower direction illustrated in FIG. 2A) orthogonal to a longitudinal direction (a left-right direction illustrated in FIG. 2A) of the optical fiber F from the guide 31 toward the guide 36 illustrated in FIG. 1, and is formed to penetrate the base plate 51.

The base plate 51 is provided with the plurality of (for example, seven) fixed mandrels 55 at equal intervals. The fixed mandrel 55 is rotatably supported by a rotation shaft provided on the base plate 51 via a bearing, but the fixed mandrel 55 is fixed onto the base plate 51 and does not move in the upper-lower direction in the drawing. The fixed mandrels 55 are arranged one by one next to the through grooves 52 along the longitudinal direction of the optical fiber F. A diameter (2r) of the fixed mandrel 55 is selected from, for example, 10 mm, 15 mm, 20 mm, 30 mm, and 60 mm.

As illustrated in FIG. 2B, the bending applying device 30 includes slide plates 61 on, for example, a back side of the base plate 51. The slide plate 61 is provided with the plurality of (for example, six) movable mandrels 65 at equal intervals. In FIG. 2B, an example of a total of two slide plates 61 on each of which three movable mandrels 65 are mounted is described, but for example, one slide plate 61 on which six movable mandrels 65 are mounted may be implemented.

Each of the movable mandrels 65 is rotatably supported by a rotation shaft provided on the slide plate 61 via a bearing. Each rotation shaft is disposed in the through groove 52, and each movable mandrel 65 is disposed one by one next to the fixed mandrel 55. A diameter (2r) of the movable mandrel 65 is set to be the same as the diameter of the adjacent fixed mandrel 55, and for example, any one of 10 mm, 15 mm, 20 mm, 30 mm, and 60 mm is selected.

It is preferable that both the fixed mandrel 55 and the movable mandrel 65 are rotatably supported, but the fixed mandrel 55 and the movable mandrel 65 do not need to rotate as long as a mandrel surface is smooth and slippery.

The slide plate 61 is movable by a motor 62 in the upper-lower direction illustrated in FIG. 2A.

In a case where the movable mandrel 65 is located at one end (corresponding to a reference position where the optical fiber of the present disclosure is not bent) of the through groove 52 as illustrated in FIG. 2A and the optical fiber F is fed out from the guide 31 toward the guide 36, when the motor 62 is driven, each movable mandrel 65 moves downward along the through groove 52 as illustrated in FIG. 2C. In the case of FIG. 2C, an outer periphery of the fixed mandrel 55 and an outer periphery of the movable mandrel 65 adjacent to each other are arranged at a predetermined interval so as to face each other in a non-contact manner. The optical fiber F is wound around the outer periphery of the movable mandrel 65 and bent upward, and is wound around the outer periphery of the fixed mandrel 55 on a right side of the movable mandrel 65 and bent downward.

Figure 2D:
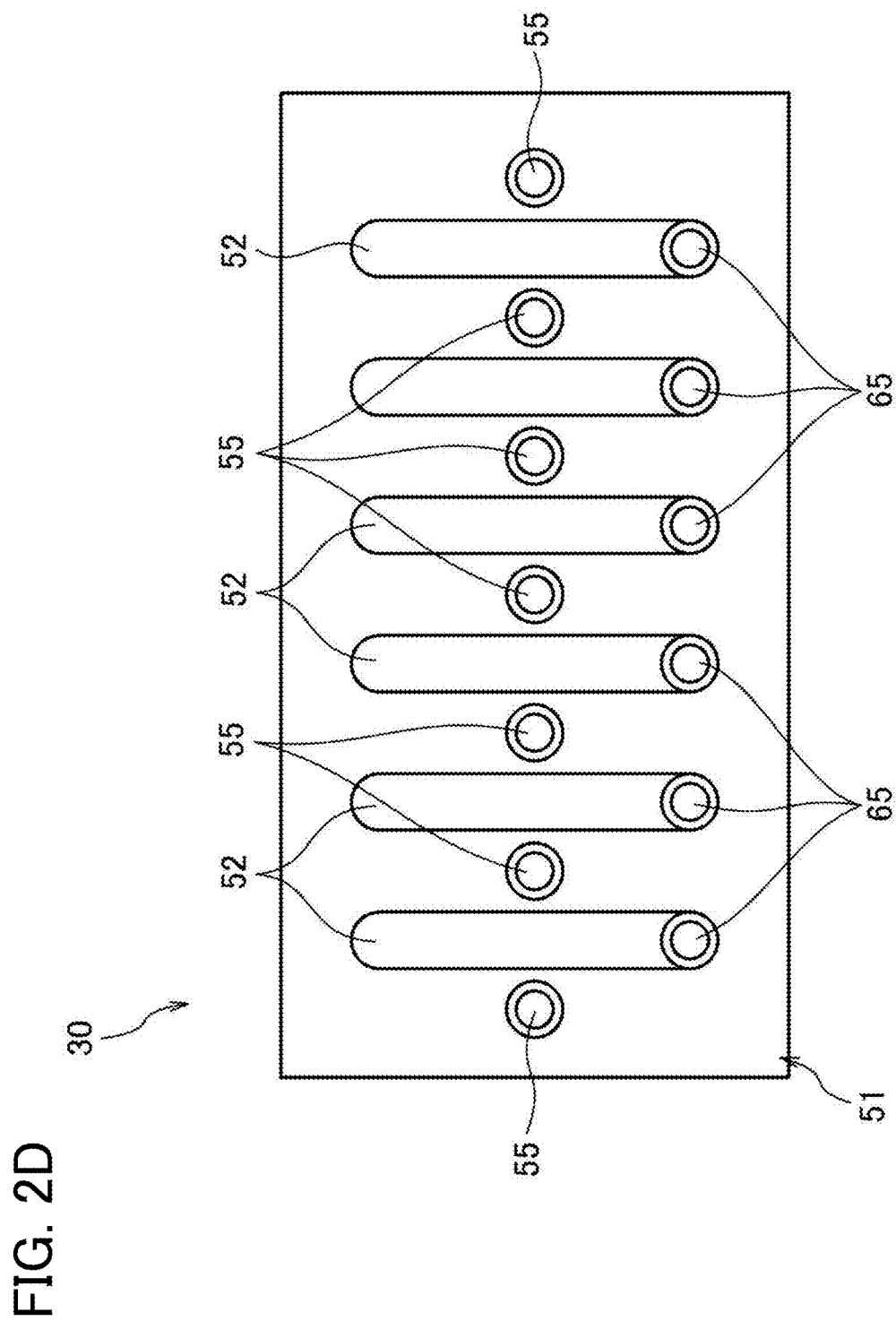
FIG. 2D is a diagram illustrating an operation of the bending applying device of FIG. 1.

Thereafter, as illustrated in FIG. 2D, when the movable mandrels 65 are moved to, for example, the other ends of the through grooves 52 (corresponding to forward positions at which bending is applied to the optical fiber of the present disclosure), the adjacent fixed mandrels 55 and movable mandrels 65 are arranged at predetermined intervals such that the outer peripheries thereof face each other in a non-contact manner, and are alternately arranged in the left-right direction with the fixed mandrels 55 on an upper side and the movable mandrels 65 on a lower side. In this case, the optical fiber F is wound around each outer periphery of the movable mandrels 65 and bent upward at an angle, for example, close to 180 degrees but not exceeding 180 degrees, and the optical fiber F is also bent downward by the fixed mandrels 55 on the right side of the movable mandrels 65 at an angle close to 180 degrees. Accordingly, bending is applied to the optical fiber F by holding the optical fiber F between the adjacent fixed mandrels 55 and movable mandrels 65.

In this way, since the movable mandrels 65 are moved to the forward positions, and the bending loss is applied to the optical fiber F by holding the optical fiber F between the movable mandrels 65 and the fixed mandrels 55, it is not necessary for an operator to hook the optical fiber to the mandrels, and the operation is not troublesome.

Example 1

Figure 3:
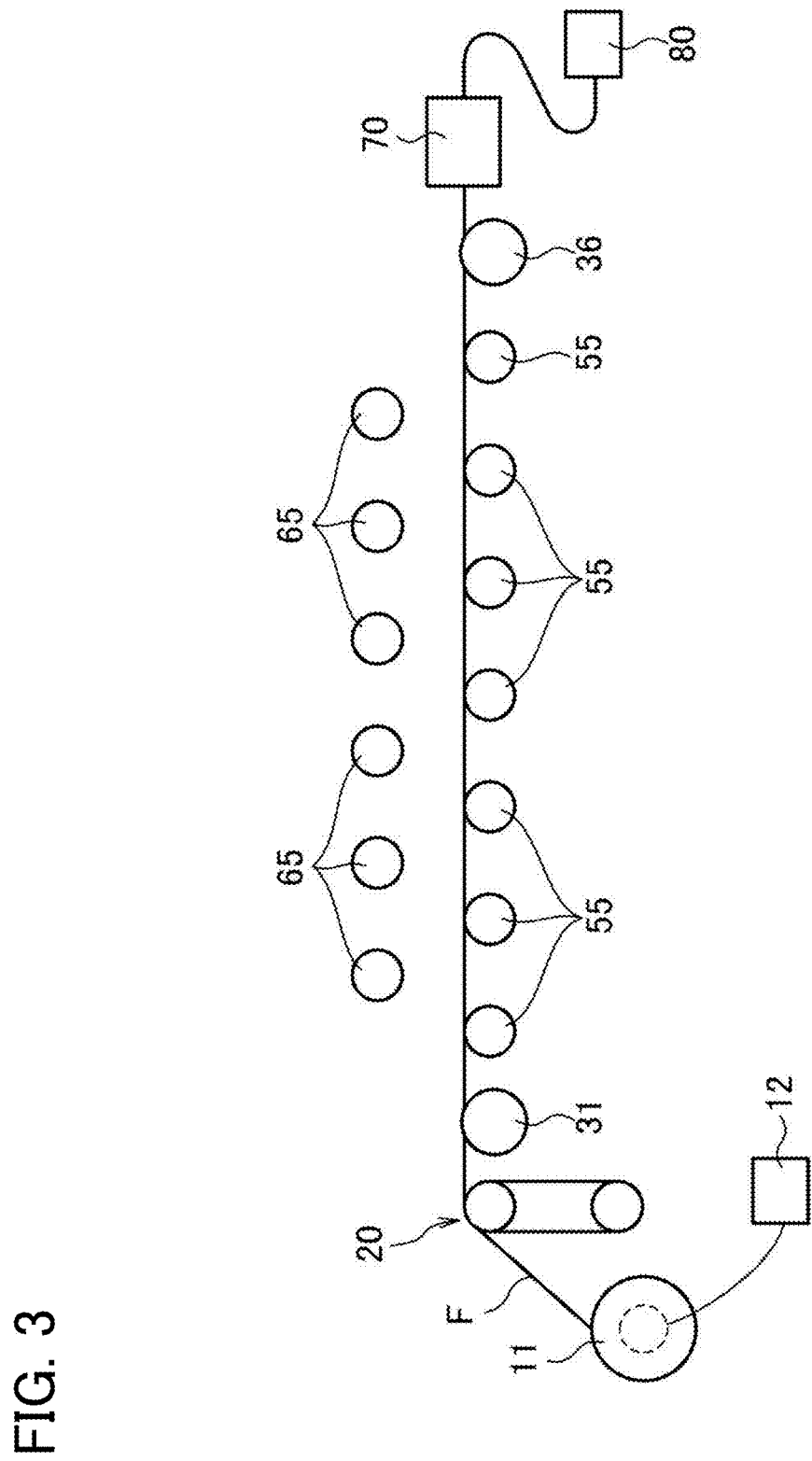
FIG. 3 is a diagram illustrating a state in which bending is not applied to an optical fiber.
Figure 4:
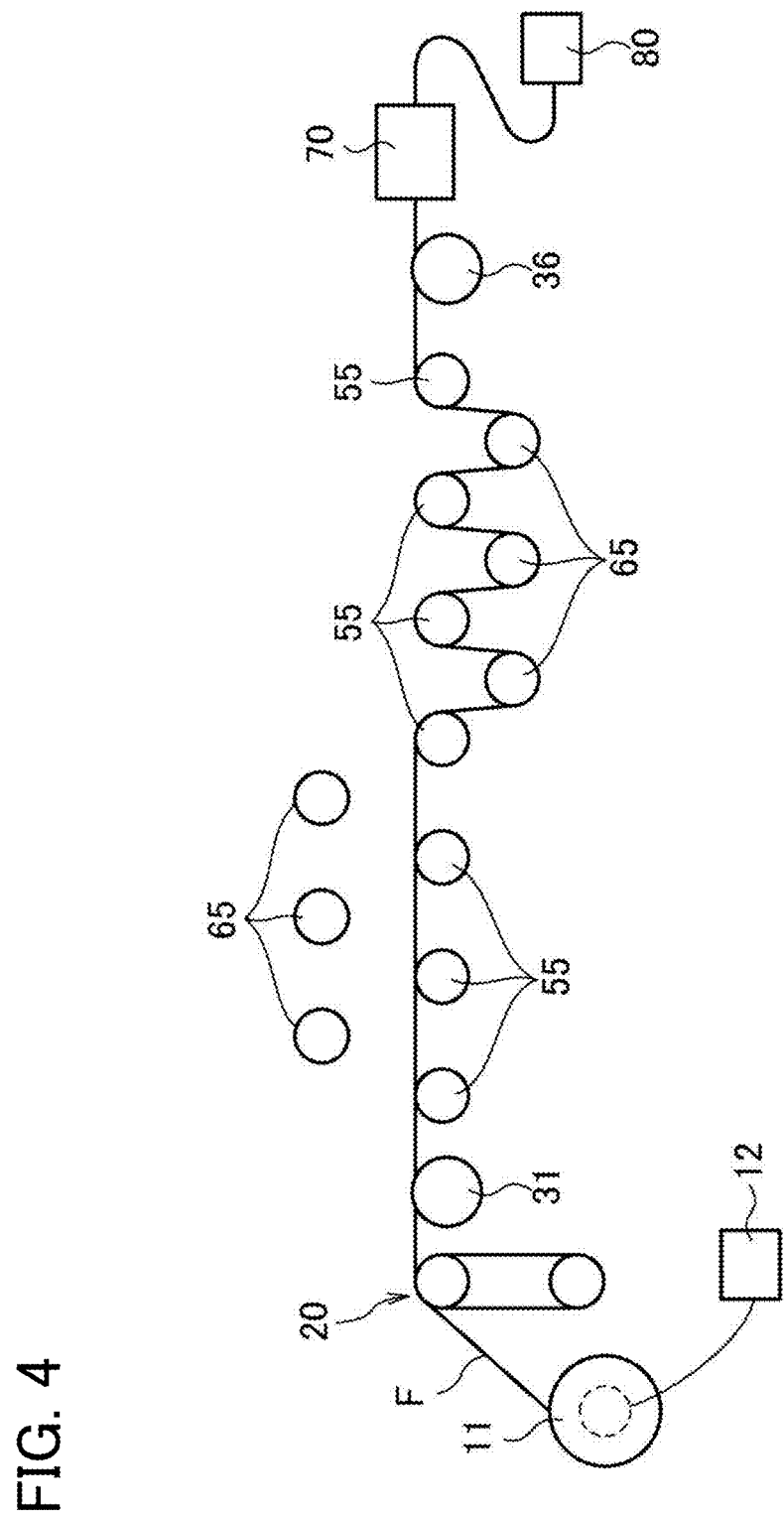
FIG. 4 is a view illustrating a state in which a part of movable mandrels are moved to apply the bending to the optical fiber.
Figure 5:
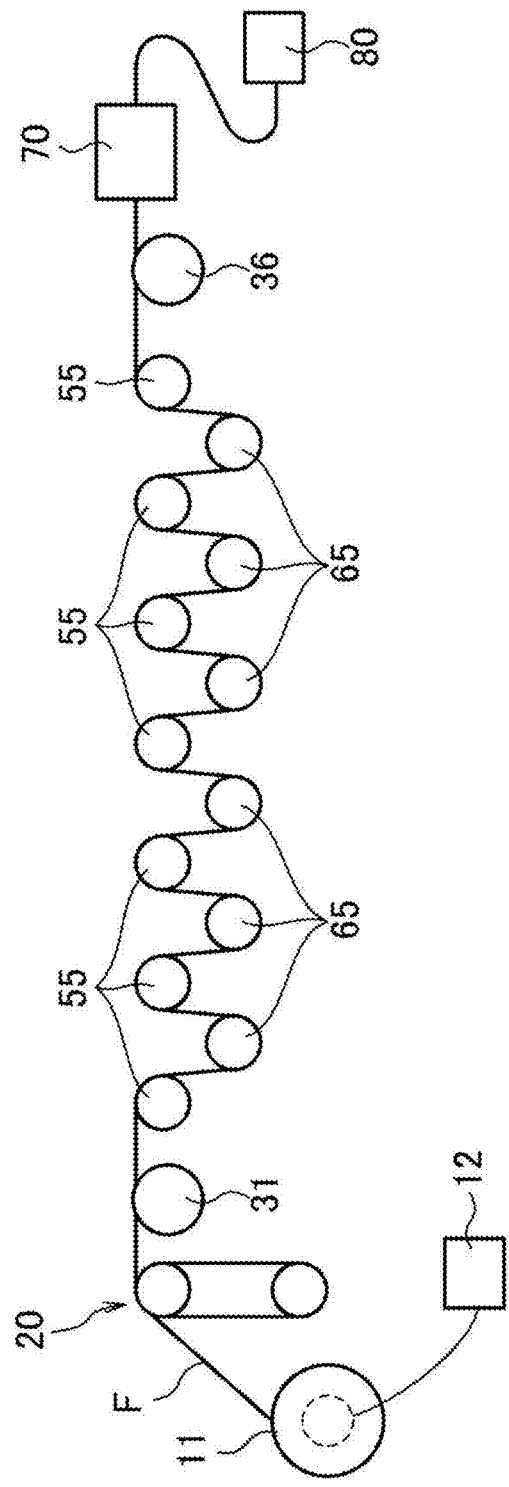
FIG. 5 is a view illustrating a state in which all the movable mandrels are moved to apply the bending to the optical fiber.

FIGS. 3 to 5 illustrate an optical fiber bending loss measuring method according to Example 1. In Example 1, the diameter (2r) of each of the fixed mandrels 55 and the movable mandrels 65 is selected to be, for example, 30 mm.

First, as illustrated in FIG. 3, the optical fiber F fed out from the bobbin 11 of the feeding portion 10 is fed out from the guide 31 toward the guide 36 in a state in which tension is applied by the dancer roller 20, and is fixed to the fiber catcher 70 (a fiber fixing step). In this case, each movable mandrel 65 is disposed at the reference position, and the optical fiber F is passed between the fixed mandrels 55 and the movable mandrels 65 and fixed to the fiber catcher 70 without being disposed between the adjacent fixed mandrels 55 and movable mandrels 65. One end of the optical fiber F is connected to the power meter 80.

Next, for example, the power of the light emitted from the optical fiber F is measured by the power meter 80 in a state in which each movable mandrel 65 is at the reference position and not moved, that is, in a state in which the optical fiber F is not bent (a reference measurement step).

Subsequently, as illustrated in FIG. 4, for example, three movable mandrels 65 located in the vicinity of the fiber catcher 70 are moved to the forward positions. Accordingly, the optical fiber F is bent upward at a predetermined angle (for example, 180 degrees) by the movable mandrels 65, and is bent downward at a predetermined angle (for example, 180 degrees) by the fixed mandrels 55 on the right side of the movable mandrels 65, so that bending is applied to the optical fiber F by holding the optical fiber F between the adjacent movable mandrels 65 and fixed mandrels 55 (a downstream-side bending applying step).

Thereafter, as illustrated in FIG. 5, the power of the light emitted from the optical fiber F is measured by the power meter 80 in a state in which, for example, three movable mandrels 65 located in the vicinity of the bobbin 11 are also moved to the forward positions, that is, the optical fiber F is bent by all of the fixed mandrels 55 and the movable mandrels 65. Then, the bending loss is calculated from a difference between the power measured in the reference measurement step and the power measured in the bending loss measurement step (a bending loss measurement step).

In this way, since bending is applied to the optical fiber F from a fiber catcher 70 side to a feeding portion 10 side, the tension generated in the optical fiber F may be leveled to eliminate a portion to which excessive tension is applied.

In Example 1, the reference measurement step, the downstream-side bending applying step, and the bending loss measurement step were performed in this order.

However, the downstream-side bending applying step, the bending loss measurement step, and the reference measurement step may also be performed in this order, and the reference measurement step may be performed after finally returning to a state in which the optical fiber F is not bent.

Further, although an example of the mandrel with a bearing has been described, the present invention may also be applied to a mandrel without the bearing when the movable mandrel 65 is sequentially moved from a fiber catcher 70 side toward a feeding portion 10 side.

Example 2

Figure 6:
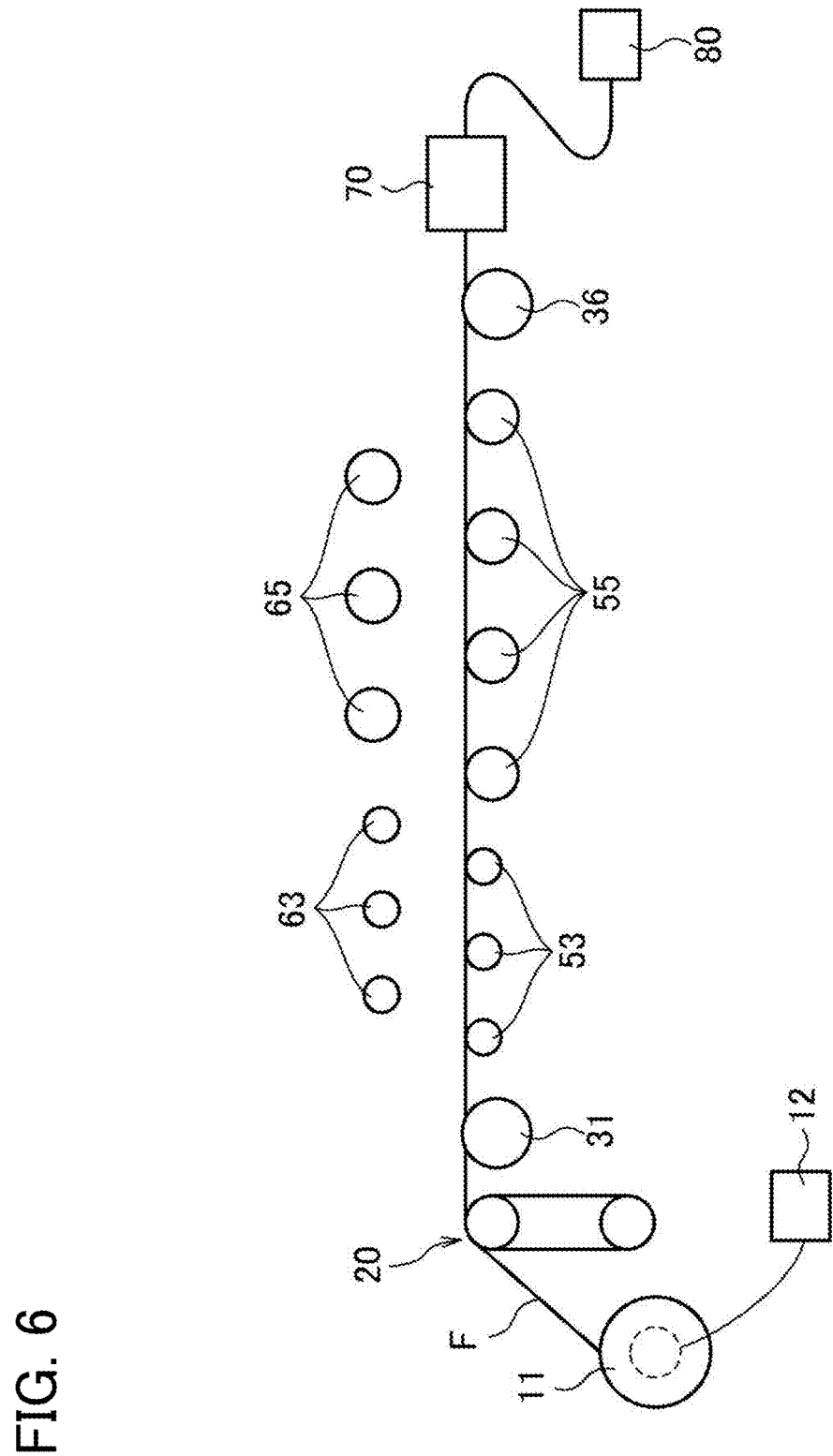
FIG. 6 is a diagram illustrating a state in which the bending is not applied to the optical fiber.
Figure 7:
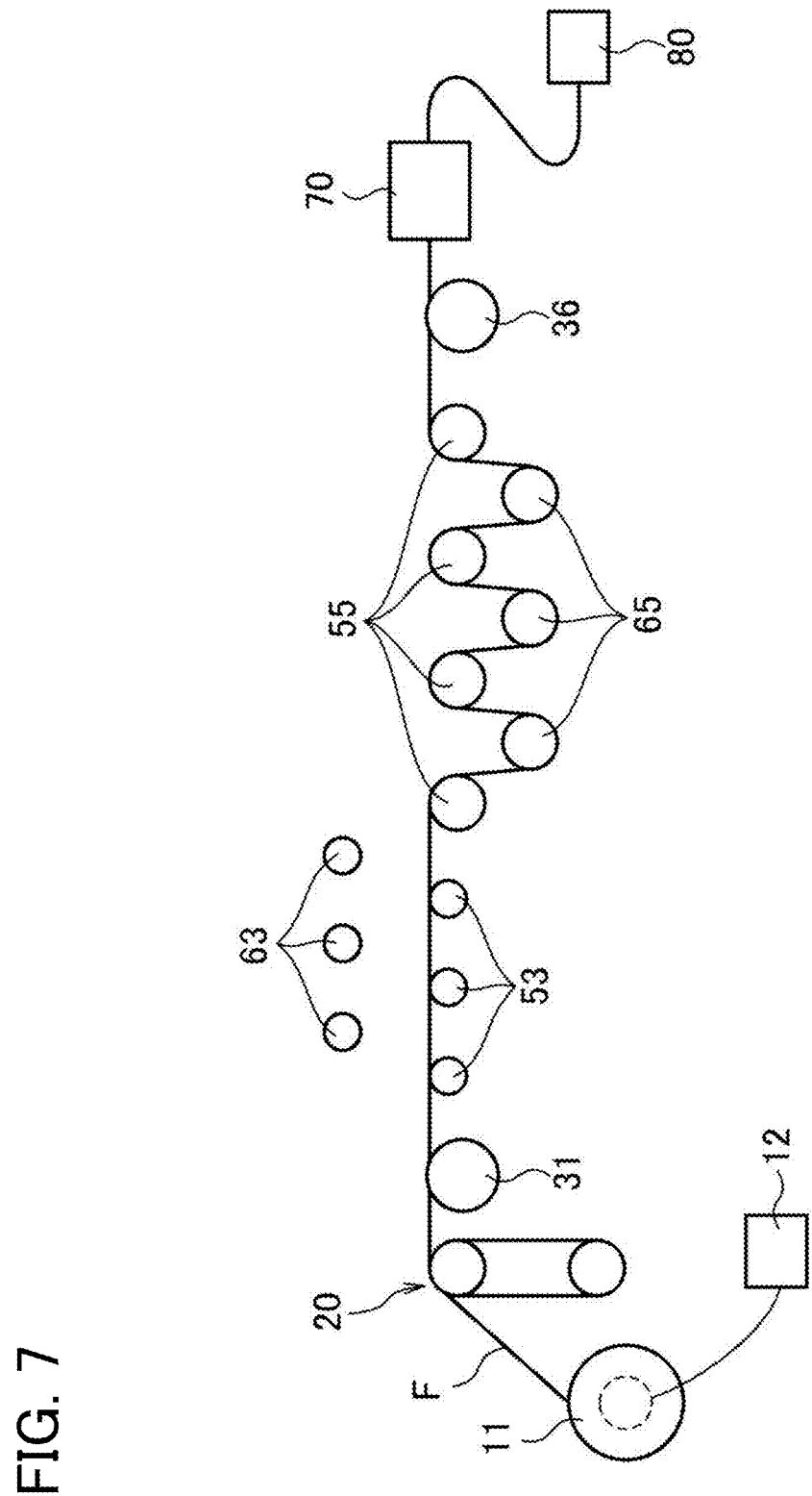
FIG. 7 is a view illustrating a state in which a part of the movable mandrels are moved to apply the bending to the optical fiber.
Figure 8:
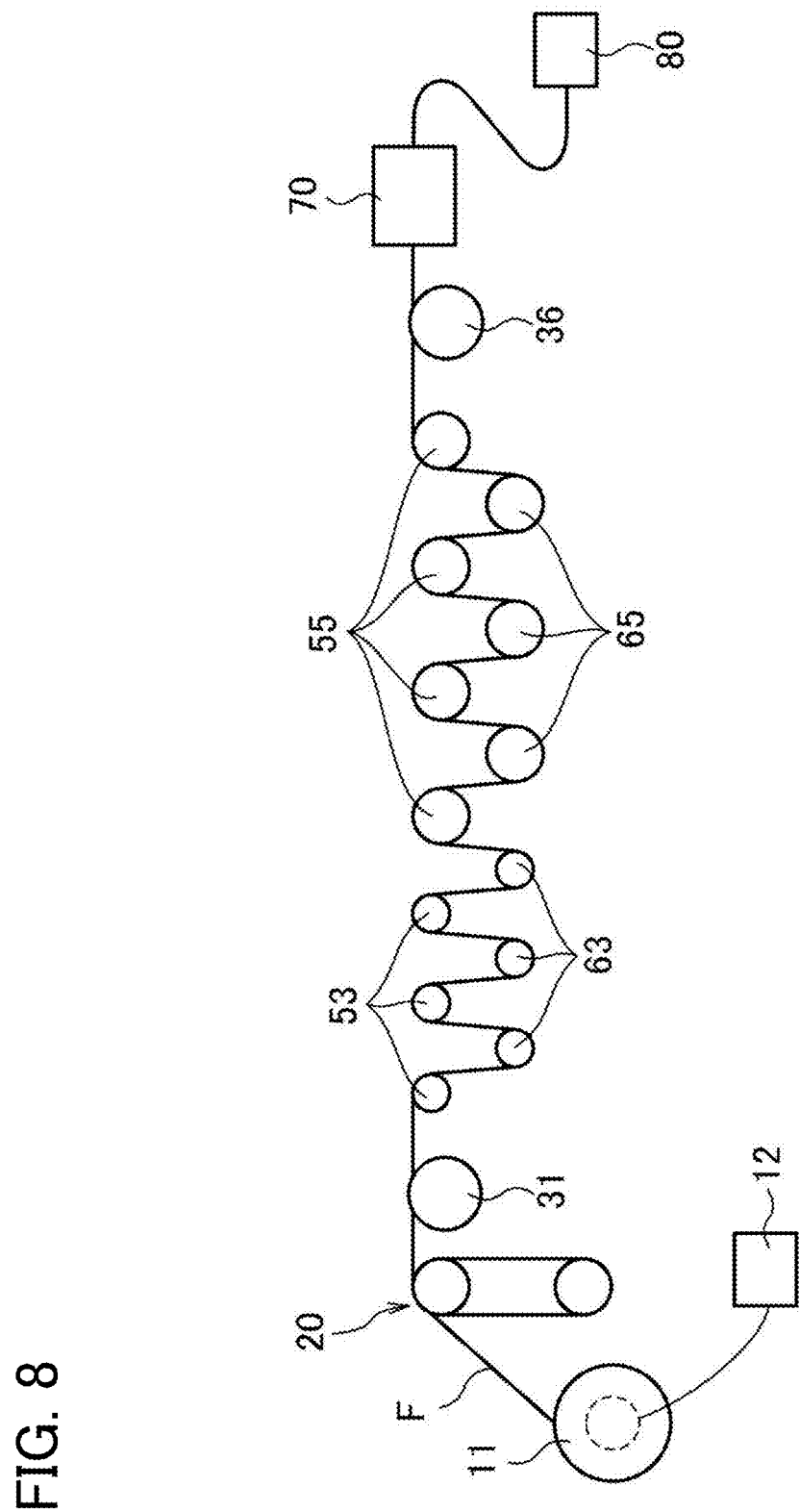
FIG. 8 is a view illustrating a state in which all the movable mandrels are moved to apply the bending to the optical fiber.

FIGS. 6 to 8 illustrate an optical fiber bending loss measuring method according to Example 2. In Example 2, the diameters (2r) of the three movable mandrels 65 and the three fixed mandrels 55 located in the vicinity of the fiber catcher 70 are selected to be, for example, 30 mm, whereas the diameters (2r) of the three movable mandrels 63 and the three fixed mandrels 53 located in the vicinity of the feeding portion 10 are selected to be, for example, 15 mm.

In the case of Example 2, similarly to Example 1, the optical fiber F fed out from the bobbin 11 is fixed to the fiber catcher 70 in a state in which tension is applied by the dancer roller 20 (a fiber fixing step: FIG. 6). Next, in a state in which the optical fiber F is not bent, the power of the light emitted from the optical fiber F is measured by the power meter 80 (a reference measurement step).

Subsequently, as illustrated in FIG. 7, the large-diameter movable mandrels 65 are moved to the forward positions, and the optical fiber F is disposed between the adjacent movable mandrels 65 and the fixed mandrels 55 to apply bending to the optical fiber F (a downstream-side bending applying step).

Then, the power of the light emitted from the optical fiber F is measured by the power meter 80 in a state in which the bending is applied by the large-diameter fixed mandrels 55 and movable mandrels 65. Then, a large-diameter bending loss is calculated from a difference between the power measured in the reference measurement step and the power measured in a large-diameter bending loss measurement step (the large-diameter bending loss measurement step).

Thereafter, as illustrated in FIG. 8, the small-diameter movable mandrels 63 are also moved to the forward positions, and the optical fiber F is bent by all of the fixed mandrels 53 and the movable mandrels 63 in addition to the fixed mandrels 55 and the movable mandrels 65 (an upstream-side bending applying step), and in this state, the power of the light emitted from the optical fiber F is measured by the power meter 80. In this case, using the power measured in the large-diameter bending loss measurement step as a reference, a small-diameter bending loss may be calculated from a difference with power measured in a state in which bending is applied by the small-diameter fixed mandrels 53 and movable mandrels 63 (a small-diameter bending loss measurement step).

As described above, since the mandrels are configured to have, for example, two types of diameters, and the large-diameter movable mandrels 65 and the small-diameter movable mandrels 63 are moved in this order to apply the bending, the bending loss with respect to a plurality of bending diameters may be measured, and the number of times of measurement as the reference is reduced. Accordingly, time required for measuring the bending loss of the optical fiber F may be shortened.

Example 3

In Examples 1 and 2, an example in which one optical fiber F is fed out from one feeding portion 10 to the bending applying device 30 has been described. However, as described above, when mandrels are used instead of rollers in the bending applying device 30, a plurality of feeding portions may be arranged in parallel along the direction intersecting the longitudinal direction of the optical fiber F.

Specifically, as illustrated in FIG. 9, when a guide 41 is disposed in parallel with a guide 31 and a guide 46 is disposed in parallel with a guide 36, the bending may be applied to the optical fiber F traveling from the guide 41 to the guide 46 as well as the optical fiber F traveling from the guide 31 to the guide 36 through use of the fixed mandrels 55 and the movable mandrels 65. Therefore, efficiency of measuring the bending loss of the optical fiber F is improved.

It should be understood that the embodiment disclosed herein is illustrative in all respects and not restrictive. The scope of the present disclosure is defined by the claims, rather than the meaning described above, and is intended to include any modifications within the scope and meaning equivalent to the claims.

REFERENCE SIGNS LIST

1 bending test apparatus
10 feeding portion
11 bobbin
12 light source
20 dancer roller
30 bending applying device
31, 36, 41, 46 guide
51 base plate
52 through groove
53, 55 fixed mandrel
61 slide plate
62 motor
63, 65 movable mandrel
70 fiber catcher (fixing portion)
80 power meter
81 light receiving unit
82 calculation unit
F optical fiber

The invention claimed is:

1. An optical fiber bending loss measuring method for obtaining a bending loss of an optical fiber by applying bending to the optical fiber by using a plurality of mandrels provided between a feeding portion of the optical fiber and a fixing portion of the optical fiber and arranged alternately in a longitudinal direction of the optical fiber, the adjacent mandrels being a fixed mandrel that is configured not to move, and a movable mandrel that is movable between a reference position at which bending is not applied to the optical fiber and a forward position at which the bending is applied to the optical fiber, the optical fiber bending loss measuring method comprising:

fixing the optical fiber to the fixing portion by passing the optical fiber fed out from the feeding portion between the mandrels in a state in which the optical fiber is not disposed between the adjacent mandrels;

moving the movable mandrel to the forward position and applying bending to the optical fiber by holding the optical fiber between the adjacent mandrels so as to bend the optical fiber at a predetermined angle with respect to the longitudinal direction; and obtaining the bending loss of the optical fiber while the bending is applied to the optical fiber, wherein among a plurality of the movable mandrels, a movable mandrel located in a vicinity of the fixing portion is moved before a movable mandrel located in a vicinity of the feeding portion to apply the bending to the optical fiber.

2. The optical fiber bending loss measuring method according to claim 1, wherein the movable mandrel located in the vicinity of the fixing portion is formed to have a larger diameter than the movable mandrel located in the vicinity of the feeding portion.

3. The optical fiber bending loss measuring method according to claim 1, wherein a plurality of feeding portions are disposed in parallel along a direction intersecting the longitudinal direction of the optical fiber.

4. The optical fiber bending loss measuring method according to claim 1, wherein, in the moving of the movable mandrel to the forward position, one of the movable mandrels located at a downstream side of an optical fiber conveyance from the feeding portion to the fixing portion starts moving toward the forward position and applying bending before the other of the movable mandrels located at an upstream side of the optical fiber conveyance starts moving toward the forward position and applying bending.

5. The optical fiber bending loss measuring method according to claim 4,
wherein the one of the movable mandrels located at the downstream side has a larger diameter than that of the other of the movable mandrels located at the upstream side.

* * * * *